Patented Jan. 11, 1938

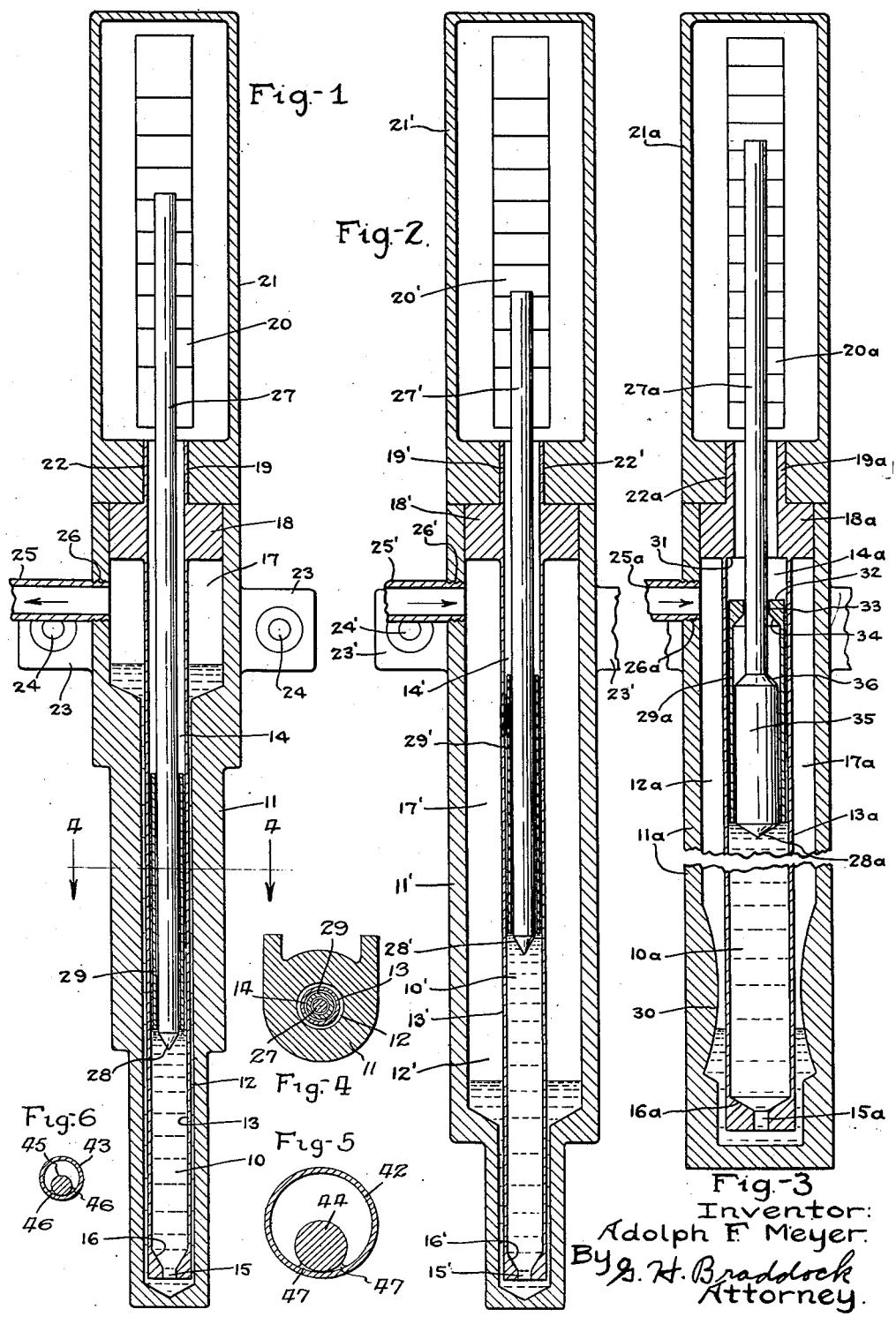
Jan. 11, 1938.   A. F. MEYER   2,105,000
MANOMETER
Filed Dec. 21, 1933
Inventor:
Adolph F. Meyer
By G. H. Braddock
Attorney.

2,105,000

UNITED STATES PATENT OFFICE 2,105,000

MANOMETER

Adolph F. Meyer, Minneapolis, Minn.

Application December 21, 1933, Serial No. 703,391

10 Claims. (Cl. 73—31)

The present invention has relation to manometers or pressure gages.

An object of the invention is to provide a manometer or pressure gage, which will include a manometer- or pressure-gage-indicating entity supported by the mercury, or equivalent, said indicating entity being projectable beyond the confines of the container for mercury and rising and falling with the level of mercury in said container.

A further object is to provide a manometer or pressure gage which will include a container having mercury therein, and an indicator so floated by the mercury that a submerged part of said indicator will always be substantially surrounded by mercury.

A further object is to provide a manometer or pressure gage which will include an indicator floated in partially submerged condition by mercury with the submerged portion of the indicator substantially surrounded by mercury under all conditions, whereby the resultant force exerted by the mercury will at all times be sufficient to float said indicator at its natural elevation.

A further object is to provide a manometer or pressure gage which will include a container with mercury therein, and an indicator floated by the mercury, a portion of the indicator being submerged in the mercury and so arranged in the container that the mercury will at all times exert substantially a maximum resultant force tending to float the indicator.

A further object is to provide a manometer or pressure gage which will include a container with mercury therein, and an indicator floated by the mercury, a portion of the indicator being submerged in the mercury in constantly spaced relation to the surrounding wall of the container, whereby the mercury will at all times exert substantially a maximum lifting force upon said indicator.

A further object is to provide a manometer or pressure gage which will include a container or vessel with mercury therein, a member floated upon the mercury and having a sliding arrangement in the container or vessel, and an indicator slidably arranged in the member and floated in partially submerged condition by the mercury.

And a further object is to provide a manometer or pressure gage which will include a container or vessel with mercury therein, a tube floated upon the mercury and slidably fitted to the container or vessel, and an indicator slidably fitted to the tube, said indicator being floated by the mercury and including a portion thereof extending upwardly beyond the container or vessel.

With the above objects in view, as well as others which will appear as the specification proceeds, the invention comprises the construction, arrangement and combination of parts as now to be fully described and as hereinafter to be specifically claimed, it being understood that the disclosure herein is merely illustrative and intended in no way in a limiting sense, changes in details of construction and arrangement of parts being permissible so long as within the spirit of the invention and the scope of the claims which follow.

In the accompanying drawing forming a part of this specification,

Fig. 1 is a vertical sectional view of a manometer or pressure gage made according to the principles of the invention, more especially suitable for measuring or indicating pressure changes when caused by suction;

Fig. 2 is a vertical sectional view of a manometer or pressure gage also made according to the invention, more especially suitable for measuring or indicating pressure changes when caused by pressure;

Fig. 3 is a vertical sectional view of a modified form of manometer or pressure gage more especially suitable for measuring or indicating pressure;

Fig. 4 is an enlarged horizontal sectional view, taken as on line 5—5 in Fig. 1, detailing the indicator float and separator tube as in said Fig. 1;

Figs. 5 and 6 are diagrammatic sectional views for illustrating the manner in which rod floats can be forced against the sides of containers or vessels therefor by mercury only partially surrounding the rod floats, as hereinafter to be explained.

Referring more particularly to Figs. 1 and 4 of the drawing, a U-member constituting a nonbreakable container for mercury 10, consists of an outer, non-fragile, desirably metallic element 11 providing a surrounding concavity or chamber 12, and an inner, non-fragile, desirably metallic element 13 providing a preferably straight and cylindrical, upstanding passageway 14. The element 13 is open at its upper portion, and includes a port 15 at its lower end and a valve seat 16 above the port. Said element 13 is spaced from the surrounding wall of the element 11 except at the upper portion of the element 13, and the port 15 connects the lower portions of the concavity or chamber 12 and the passageway 14 with each other. The concavity or chamber 12 is enlarged at its upper portion, as indicated at 17, and the element 13 includes an annular flange 18 desirably tightly fitted into the mouth of the enlarged portion 17. A portion 19 of the element 13 projects upwardly from the annular flange 18, which annular flange terminates flush with the upper end of the element 11. A scale 20 for the manometer or pressure gage is supported by a fixture or standard 21 which has an opening 22 fitted to the portion 19 of the element 13. The fixture or standard 21 rests upon the annular flange 18 and the upper end of the element 11. Supporting ears 23 for the manometer or pressure gage are desirably integral with the element 11 and have bolt receiving holes 24 by means of which the device or instrument can be attached in upright position to a supporting structure. A pipe 25 communicates with the enlarged portion 17 of the concavity or chamber 12, as indicated at 26, at location below the elevation of the annular flange 18.

An indicator rod for the manometer or pressure gage is denoted 27. Said rod 27 is of elongated configuration. It may desirably be circular in cross-section. The lower portion of the rod is within the passageway 14 of the element 13, and the lower end of said rod is submerged in the mercury, the rod being floated by the mercury. At 28 said rod 27 is shaped to constitute a valve adapted to fit the valve seat 16 to thus close the port 15. The upper portion of the indicator rod projects upwardly beyond the element 13 and its passageway 14 and lies in front of the vertically disposed scale 20. Naturally, the indicator rod 27 will be of length suitable to its purpose, and the scale will be properly calibrated.

A separator tube for the indicator rod is represented 29. Said tube 29 is floated upon the mercury in the passageway 14 of the element 13 and is slidably fitted to said element 13 to rise and fall with the level of the mercury said separator tube constituting a guide for the indicator rod. The indicator rod 27 is slidably fitted to the tube 29, as very clearly shown in Figs. 1 and 4, and thus said tube effectually maintains said indicator rod and its submerged portion out of contact with the surrounding wall of the manometer or pressure gage under all conditions.

The manometer or pressure gage as in Figs. 1 and 4 is more especially suitable for measuring or indicating pressure changes when caused by suction. The arrow in the pipe 25 in Fig. 1 denotes that suction is being applied. The column of mercury in the concavity or chamber 12 and the passageway 14 will stand balanced against atmospheric pressure in the pipe 25 and the enlarged portion 17 to float the indicator rod 27 so that its upper end is at the highest elevation on the scale 20. Then as suction is applied at said pipe 25 and said enlarged portion 17, mercury will be elevated in the concavity or chamber 12 and depressed in the passageway 14. Obviously, the indicator rod 27 and the separator tube 29 will rise and fall with the level of mercury in the passageway 14. A satisfactory arrangement is to utilize a separator tube, such as 29, which is but a fraction of the length of the indicator rod, such as 27.

As will be clear from Fig. 1, the relative sizes and arrangement of the elements 11 and 13, and the amount of mercury employed, are such that before the level of mercury in the enlarged portion 17 can reach the elevation of the pipe 25, because of suction, the valve 28 of the indicator rod will have engaged the valve seat 16 to shut off the port 15. Thus is the possibility of passage of mercury from the U-member through the pipe 25 effectually precluded. The mouth of the enlarged portion 17 being closed by the annular flange 18, the mercury cannot otherwise pass from the concavity or chamber 12 save through the passageway 14. To preclude the possibility of the travel of mercury upwardly out of the portion 19 of the passageway 14, as by a surging at the pipe 25 caused by back pressure, the relative sizes and arrangement of the elements 11 and 13, and the amount of mercury employed, are such that within the range of the manometer or pressure gage, the mercury cannot reach any dangerous level in the passageway 14. That is to say, the device is so constructed that the mercury when under atmospheric pressure in the enlarged portion 17 is at elevation considerably below the upper end of the passageway, so that should the pressure in said enlarged portion 17 become considerably above atmospheric, the level of mercury would not yet reach overflowing elevation in said passageway 14. Thus, it will be seen, the non-fragile container will completely house the whole of the column of mercury throughout the range of the manometer or pressure gage, including both its normal and any unexpected range, and insure against loss of mercury as has heretofore occurred when mercury has entered glass tubes or other fragile members constituting mercury receiving chambers or passages of manometers or pressure gages. In the device or instrument of the invention, the liquid employed as a medium balanced against pressure to be measured, ordinarily mercury, will be permanently housed in the non-fragile container, which in effect will constitute a non-breakable seal for the mercury.

In Fig. 2 of the drawing, a U-member constituting a non-breakable container for mercury 10' consists of an outer, non-fragile, desirably metallic element 11' providing a surrounding concavity or chamber 12', and an inner, non-fragile, desirably metallic element 13' providing a preferably straight and cylindrical, upstanding passageway 14'. The element 13' is constructed precisely like the element 13 and includes a port 15' and a valve seat 16' above the port. Said element 13' is mounted in the element 11' in the same manner as above described, and the port 15' functions in the same manner as does the port 15. The concavity or chamber 12' is enlarged for the greater portion of its length, as indicated at 17', and the element 13' includes an annular flange 18' fitted to the element 11' in the manner as set forth in connection with the element 13. A portion 19' of the element 13' projects upwardly from the annular flange 18', as before described. A scale 20' is upon a fixture or standard 21' supported by its opening 22' as hereinbefore appears. Ears 23' with holes 24' are for the same purpose as the equivalent parts shown in Fig. 1. A pipe 25' communicates with the upper part of the enlarged portion 17', as indicated at 26', at location below the annular flange 18'.

An indicator rod 27' is equivalent to the indicator rod 27, said rod 27' including a valve 28' to fit the valve seat 16', and being slidably fitted to a separator tube 29' floated upon the mercury in the passageway 14' and slidably fitted to the element 13'. In short, the elements 13', 14', 15', 16', 27', 28' and 29' are equivalent to the elements 13, 14, 15, 16, 27, 28 and 29 before described, and similarly function.

The manometer or pressure gage as in Fig. 2 is more especially suitable for measuring or indicating pressure changes when caused by pressure. The arrow in the pipe 25' in Fig. 2 denotes that pressure is being applied. The column of mercury in the concavity or chamber 12' and the passageway 14' will stand balanced against atmospheric pressure in the pipe 25' and the enlarged portion 17' to float the indicator rod 27' so that its upper end is at the lowest elevation on the scale 20'. Then as pressure is applied at said pipe 25' and said enlarged portion 17', mercury will be depressed in the concavity or chamber 12' and elevated in the passageway 14'. Obviously, the indicator rod 27' and the separator tube 29' will rise and fall with the level of mercury in the passageway 14'.

As will be clear from Fig. 2, the relative sizes and arrangement of the elements 11' and 13', and the amount of mercury employed, are such that before the level of the mercury in the enlarged portion 17' can reach the elevation of the pipe 25' because of surging causing back pressure, the valve 28' of the indicator rod will have engaged the valve seat 16' to shut off the port 15', so that the possibility of passage of mercury from the U-member through the pipe 25' is effectually precluded, as already set forth. The mouth of the enlarged portion 17' being closed by the annular flange 18', the mercury cannot otherwise pass from the concavity or chamber 12' save through the passageway 14'. To preclude the possibility of the travel of mercury upwardly out of the portion 19' of the passageway 14' by pressure at the pipe 25' and the enlarged portion 17', the relative sizes and arrangement of the elements 11' and 13', and the amount of mercury employed, are such that within the range of the manometer or pressure gage, the mercury cannot reach any dangerous level in the passageway 14'. That is, the mercury when under the maximum pressure intended to exist in the enlarged portion 17' is at elevation considerably below the upper end of the passageway 14', so that should the pressure in said enlarged portion 17' become considerably above said maximum pressure intended, the level of mercury would not yet reach overflowing elevation in said passageway 14'. Thus, the non-fragile container of Fig. 2 completely houses the whole of the column of mercury throughout the range of the manometer or pressure gage, in the same general manner and with the same result as described in connection with Fig. 1.

It will be noted that the scales 20 and 20' of Figs. 1 and 2 have unequal division lines. The division of the scale will of course depend upon the working conditions.

In Fig. 3 there is shown a scale 20ª with equal division lines, and an element 11ª, equivalent to the element 11', is shown shaped at 30 to make provision for said equal division lines. Aside from the features just mentioned, the device or instrument of Fig. 3 is the same as that of Fig. 2, except that an annular flange 18ª, equivalent to the annular flange 18', includes an internal circular shoulder 31 against which an upper base 32 of a separator tube 29ª, equivalent to the tube 29', is adapted to engage when said separator tube 29ª reaches its highest elevation. Also, the upper base 32 includes an opening 33 for an indicator rod 27ª, equivalent to the rod 27', and a valve seat 34 beneath the opening, and said indicator rod 27ª has an enlarged portion 35 slidably fitted to the separator tube 29ª. The upper end of the enlarged portion 35 is shaped, as at 36, to provide a valve for the valve seat 34, and the lower end of said enlarged portion 35 is shaped, as at 28ª, to provide a valve for the valve seat 16ª above the port 15ª.

The manometer or pressure gage as in Fig. 3 is, like the disclosure as in Fig. 2, more especially suitable for measuring or indicating pressure changes when caused by pressure. The arrow in the pipe 25ª in Fig. 3 denotes that pressure is being applied. The column of mercury in the concavity or chamber 12ª and the passageway 14ª will stand balanced against atmospheric pressure in the pipe 25ª and the enlarged portion 17ª to float the indicator rod 27ª so that its upper end is at the lowest elevation on the scale 20ª carried by the fixture or standard 21ª. As pressure is applied at said pipe 25ª and said enlarged portion 17ª, mercury 10ª will be depressed in the chamber 12ª having the shaped portion 30 and elevated in the passageway 14ª. The indicator rod 27ª and the separator tube 29ª will rise and fall with the level of mercury in the passageway 14ª.

As will be clear from Fig. 3, the relative sizes and arrangement of the elements 11ª and 13ª, and the amount of mercury employed, are such that before the level of the mercury in the enlarged portion 17ª can reach the elevation of the pipe 25ª because of surging causing back pressure in the pipe 25ª and the portion 17ª, the valve 28ª of the indicator rod 27ª will have engaged the valve seat 16ª to shut off the port 15ª, so that the possibility of passage of mercury from the U-member through the pipe 25ª is effectually precluded. The mouth of the enlarged portion 17ª being closed by the annular flange 18ª, the mercury cannot otherwise pass from the concavity or chamber 12ª save through the passageway 14ª. The mercury when under pressure greater than the maximum pressure intended to exist in the enlarged portion 17ª will cause the upper base 32 of the separator tube 29ª to engage the circular shoulder 31 and the valve 36 to engage the valve seat 34, to thus preclude the possibility of the travel of mercury upwardly out of the portion 19ª of the passageway 14ª by pressure at the pipe 25ª and the enlarged portion 17ª. Evidently, the non-fragile container of Fig. 3 completely houses the whole of the column of mercury throughout the range of the manometer or pressure gage, and constitutes a non-breakable seal for the mercury.

In Figs. 5 and 6 of the drawing there is disclosed two separate mercury containing vessels, denoted 42 and 43, respectively, each with a rod float, indicated 44 and 45, respectively, the rod floats being suggested as indicator rods, such as 27, 27', and 27ª, for manometers or pressure gages employing mercury as the medium balanced against pressure to be measured. But it has been discovered that an indicator rod so floated on mercury and guided by the surrounding wall of the containing vessel for the mercury is not a satisfactory arrangement, because there is always tendency for the mercury to hold the indicator rod against the side of the vessel, when for any reason the indicator rod becomes depressed in the mercury, and thus cause the rod to become stuck. The reason for the sticking of the indicator rod is that when the rod is forced down into the mercury, the heavy mercury with its high surface tension forces the rod against the side of the vessel so that over the area, and near the area, of contact there is no mercury. On account of the high surface tension of mercury, and the repulsion between the mercury and the material of the container and the rod, this area devoid of mercury is of substantial width. Speaking generally, when the rod float and the containing vessel are of nearly the same size, there is greater tendency toward sticking of the rod. The tendency for the float to stick after having been forced down into the mercury in the vessel is not only related to the relative areas of the float and vessel, but also to the diameter of the float, and the depth to which the float is forced into the mercury. The force pressing the float against the wall of the vessel is proportional to the depth of immersion and the width of the void space back of the rod. The friction coefficient, of course, must also be considered.

More specifically, a small diameter rod, such as 45, in a vessel, such as 43, when placed against the side of the vessel will be held, as shown in Fig. 6, by a force proportional to the depth of submergence and the width of the space, represented 46, back of the rod not occupied by mercury. As disclosed in said Fig. 6, the repellent action of the mercury with respect to the wall of the vessel and rod is such that the width of the void space 46 back of the rod is about equal to the diameter of the rod, whereas in the case of the rod 44 in the vessel 42 of Fig. 5, the width of the void space 47 back of said rod 44 is about equal to the width of the void space 46 back of the rod 45, the rod 44 and vessel 42 being of about the same relative diameters as are the rod 45 and the vessel 43. Therefore, for a given submergence, the force tending to hold the rod 45 against the side of the vessel 43 is relatively much larger than the force tending to hold the rod 44 against the vessel 42. On the other hand, the force tending to float the rod 44 upwardly, being proportional to the square of the diameter, is relatively much greater than is the force tending to float the rod 45 upwardly. It thus develops that difficulties are encountered with rods as in Figs. 5 and 6, particularly those for use with small-scale, low-cost apparatus employing fluid such as mercury. It is a readily demonstrable fact that when a rod of even relatively light material and of, say, one-eighth or one-quarter inch diameter and six inches length is floated on mercury in a guiding vessel for the rod, and is forced down into the mercury for a distance of, say, two inches, the rod will not float upward again, but will be held quite rigidly against the side of the vessel, as in Figs. 8 and 9, by the pressure of the mercury against the rod.

The keeping of the rod away from the side or wall of the guiding vessel therefor, as by employment of a separator tube, such as 29, 29', or 29ª, so that the mercury will surround the rod when forced down in the mercury, will cause a depressed rod to quickly rise to its natural elevation in the mercury when released. As will be evident, whenever the rod is forced down into the mercury, the separator tube is forced upwardly by the displacement of mercury, permitting the mercury to completely surround the rod and to quickly force the rod upwardly when released. There is no tendency for the rod to become locked by mercury getting between the separator tube and rod, because any displacement of mercury readily elevates the tube which is relatively light and always follows the mercury level. Also, there is no tendency for the mercury to lock the separator tube in the vessel against the side or wall thereof while said tube floats upon the surface of the mercury. In addition, should there be tendency at some time or other toward locking the separator tube or the indicator rod, this tendency will be quickly removed, because any locking of the tube and rod, in the arrangements as disclosed in Figs. 1, 2 and 3, would require a nice balancing of the forces occasioned by the mercury at a single side of both the rod and the tube, and such a balancing is evidently not even a remote possibility.

An indicator rod floated in partially submerged condition on mercury as in Figs. 1, 2 and 3, so that the submerged portion of the rod will be surrounded by mercury under all conditions, insures that the resultant force exerted by the mercury will at all times be the maximum resultant force tending to float the rod.

What I claim is:

1. A manometer comprising a vessel adapted to receive a liquid to be balanced against pressure to be measured, a member adapted to be floated upon said liquid to have a sliding arrangement in said vessel, and an indicator adapted to be slidably arranged in said member and floated in partially submerged condition by said liquid.

2. A manometer comprising a vessel having mercury therein adapted to be balanced against pressure to be measured, a tube floated upon said mercury and slidably guided by said vessel, and an indicator slidably guided by said tube, said indicator being floated by said mercury and including a portion thereof extending upwardly.

3. A manometer comprising a vessel adapted to receive mercury to be balanced against pressure to be measured, a tube adapted to be floated upon said mercury and slidably guided by said vessel, and a relatively long float adapted to be surrounded by said tube and supported by said mercury, said float being adapted to indicate the level of mercury in said vessel.

4. A manometer comprising a vessel for receiving a liquid adapted to be balanced against pressure to be measured, a tube adapted to be floated by said liquid and guided by said vessel, and a rod float adapted to be loosely surrounded by said tube and guided thereby, said rod float being adapted to be supported by said liquid to indicate the level thereof in said vessel.

5. A manometer comprising a vessel having a liquid therein adapted to be balanced against pressure to be measured, a relatively short, hollow tube floated by said liquid and guided by said vessel, and a relatively longer cylindraceous member constituting an indicator float supported in partially submerged condition by said liquid to indicate the level thereof in said vessel, said relatively short, hollow tube surrounding said indicator float in loose-fitting relation thereto.

6. A manometer comprising a vessel adapted to receive a liquid to be balanced against pressure to be measured, and an indicator and an elongated guide therefor floated by said liquid, said indicator and guide being adapted to have movement relatively to each other.

7. A manometer comprising a vessel adapted to receive a liquid to be balanced against pressure to be measured, and an indicator and an elongated guide therefor floated by said liquid, said guide spacing said indicator from the wall of said vessel, and said indicator and guide being adapted to have movement relatively to each other.

8. A manometer comprising a vessel adapted to receive a liquid to be balanced against pressure to be measured, and an indicator and an elongated guide therefor floated by said liquid, said guide spacing said indicator from the wall of said vessel, said indicator projecting upwardly of said vessel, and said indicator and guide being adapted to have movement relatively to each other.

9. A manometer comprising a vessel adapted to receive a liquid to be balanced against pressure to be measured, an indicator floated by said liquid and extending upwardly in said vessel, said indicator being partially submerged in said liquid, and elongated means floated by said liquid for causing the submerged portion of said indicator to be at least partially surrounded by liquid between the indicator and the wall of the vessel, said indicator and said means being adapted to have movement relatively to each other.

10. A manometer comprising a vessel adapted to receive a liquid to be balanced against pressure to be measured, an elongated member adapted to be floated by said liquid and guided by said vessel, and a rod float adapted to be guided by said member, said rod float being adapted to be supported by said liquid to indicate the level thereof in said vessel, and said rod float and member being adapted to have movement relatively to each other.

ADOLPH F. MEYER.